US005329803A

United States Patent [19]

Booth

[11] Patent Number: 5,329,803

[45] Date of Patent: Jul. 19, 1994

[54] DIESEL FUEL INJECTOR TUNING TOOL

[76] Inventor: Keith Booth, 3525 SW. 15th Ct., Fort Lauderdale, Fla. 33312

[21] Appl. No.: 976,572

[22] Filed: Nov. 16, 1992

[51] Int. Cl.[5] .......... G01M 15/00

[52] U.S. Cl. .......... 73/119 A; 33/607

[58] Field of Search .......... 73/119 A; 33/783, 806, 33/832, 833, 838, 501.05, 501.08, 501.09, 501.6, 607

[56] References Cited

U.S. PATENT DOCUMENTS

| | | | |
|---|---|---|---|
| 2,285,711 | 6/1942 | Hartridge | 73/119 A |
| 2,819,534 | 1/1958 | Kitzman | 33/607 |
| 2,855,692 | 10/1958 | Campbell | 33/607 |
| 4,098,233 | 7/1978 | Boyd | 73/119 A |
| 4,503,619 | 3/1985 | Nelsen et al. | 33/607 |

*Primary Examiner*—Robert Raevis
*Attorney, Agent, or Firm*—Frank L. Kubler

[57] ABSTRACT

A tool for tuning an engine having a fuel injector unit with a follower and a body with a flange portion protruding outward from the body, includes a support structure having a follower contact surface, a plunger member slidably connected to the support structure, for bearing against the flange portion, a light source connected to a power source, a circuit for delivering electric current from the power source to the light source, and a switch which closes the circuit when the plunger member is moved to a predetermined position, and opens the circuit when the plunger member moves out of the predetermined position. The support structure preferably includes a tubular housing having two ends and which receives the plunger member in one end. A spring is preferably provided for biasing the plunger member in an extended position relative to the support structure. The follower contact surface preferably includes an outward projecting arm member, including a plate having a recess for receiving the top of the follower. A method is provided for tuning a fuel injector having a follower and a body portion and a flange protruding from the body portion, using the above-described tool, including the steps of placing the plunger member against the flange, positioning the arm member over the follower, moving the support structure toward the flange until the arm member touches the follower, and observing whether the light source becomes activated.

10 Claims, 3 Drawing Sheets

DIESEL FUEL INJECTOR TUNING TOOL

BACKGROUND OF THE INVENTION

1. Field of the Invention

The present invention relates generally to the field of tools for tuning a diesel engine by adjusting the elevation of the follower on each mechanical injector unit, and more specifically to a tuning tool including a cylindrical housing having a perpendicularly protruding arm member for placing against the top of a follower, and including a spring-biased plunger protruding through one end of the housing for bearing against the injector fuel supply flange, and including a light source at the other end of the housing, and containing an electric power source and a circuit for delivering electricity from the power source to the light source, the circuit including a first conductor member attached to the plunger and a second conductor member attached to the housing which become aligned to complete the circuit only when the housing is moved relative to the plunger to a specific, pre-calibrated position, so that when the plunger is placed against the injector fuel supply flange and the housing is moved longitudinally against the biasing of the plunger until the housing arm member makes contact with the top of the follower, the light source is activated only when the follower elevation reaches proper adjustment.

2. Description of the Prior Art

There have long been tools for measuring the elevation of a diesel fuel injector follower relative to the injector body to determine if the injector is properly adjusted. Proper tuning is important because mis-adjustment leads to poor fuel efficiency and a heavy discharge of unburned gaseous pollutants. The Federal Government and the State of California now require that diesel engines be certified as correctly tuned, and truck drivers can receive traffic tickets if their trucks produce too much smoke.

The best known tool of this type is a shaft having one end narrowed to a needle tip and having a radially protruding arm portion. The shaft is positioned parallel to the longitudinal axis of the follower and the shaft needle tip is inserted into a small tool receiving hole in the injector fuel supply flange. The elevation of the follower is then adjusted until the tool arm portion just touches the top of the follower. This type of tool is calibrated during manufacture to one permanent tuning measurement. Therefore, a disadvantage of this tool is that a shop which services different types of diesel engines must purchase a separate tool for each engine type. Another problem is that, under normal shop lighting conditions, it can be difficult to see whether the proper contact between the tool and the top of the follower has been made. Thus the tuning work can become frustrating and time-consuming.

Another prior tuning tool is a cylinder having an adjustable calibration dial and gauge at one end, and a follower and rocker arm receiving hollow in the other end. The dial is rotated to calibrate the tool for a specific adjustment specification. An adjustable contact rod extends from the dial end parallel to the cylinder to touch the injector fuel supply flange. The hollow is placed over the follower and the follower is adjusted until the contact rod just touches the fuel supply flange. A problem with this tool is that the elongate rod can be accidentally bent or the calibration dial accidentally rotated, leading to mis-measurement and mistuning. Another problem is that this tool is expensive to manufacture and subject to failure with prolonged, rugged shop use.

It is thus an object of the present invention to provide a diesel tuning tool which clearly indicates proper adjustment by activation of a light source.

It is another object of the present invention to provide such a tool which is durable and not easily thrown out of calibration with rough handling.

It is still another object of the present invention to provide such a tool which can be calibrated to numerous settings so that a single tool can be used to tune virtually all types of diesel engines.

It is finally an object of the present invention to provide such a tool which is simple and inexpensive to manufacture.

SUMMARY OF THE INVENTION

The present invention accomplishes the above-stated objectives, as well as others, as may be determined by a fair reading and interpretation of the entire specification.

A tool is provided for tuning an engine having a fuel injector unit with a follower and a body with a flange portion protruding outward from the body, including a support structure having a follower contact surface, a plunger member slidably connected to the support structure, for bearing against the flange portion, a light source connected to a power source, a circuit for delivering electric current from the power source to the light source, and a switch which closes the circuit when the plunger member is moved to a predetermined position, and opens the circuit when the plunger member moves out of the predetermined position. The support structure preferably includes a tubular housing having two ends and which receives the plunger member in one end. A spring is preferably provided for biasing the plunger member in an extended position relative to the support structure. The light source may be a light emitting diode or a light bulb. The switch preferably includes an outer washer member structurally connected to the support structure and split into at least two portions, the circuit being connected to both portions of the outer washer member so that the split opens the circuit, an inner washer member structurally connected to the plunger member, so that the outer washer member can move with the support structure relative to the inner washer member and the plunger member so that the outer washer member fits around the inner washer member and makes simultaneous contact with the portions of the outer washer member, thereby closing the circuit. The follower contact surface preferably includes an outward projecting arm member, including a plate having a recess for receiving the top of the follower. The arm member preferably has a hingedly connected portion which can be pivoted against the support structure for compact storage.

A method is provided for tuning a fuel injector having a follower and a body portion and a flange protruding from the body portion, using the above-described tool, including the steps of placing the plunger member against the flange, positioning the arm member over the follower, moving the support structure toward the flange until the arm member touches the follower, and observing whether the light source becomes activated.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
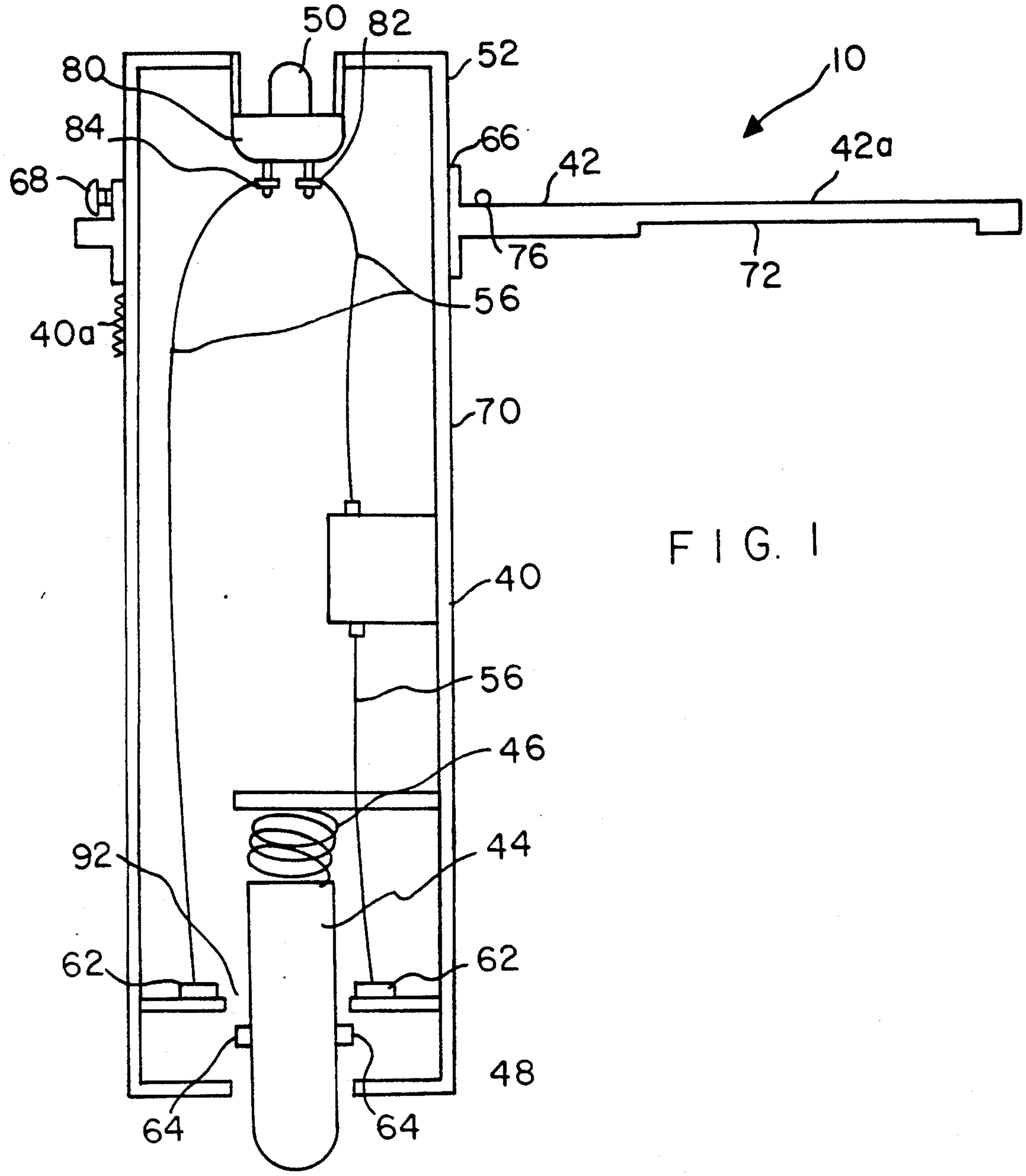
FIG. 1 is a cross-sectional side view of the inventive tuning tool, showing the plunger, light, circuit and protruding arm.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
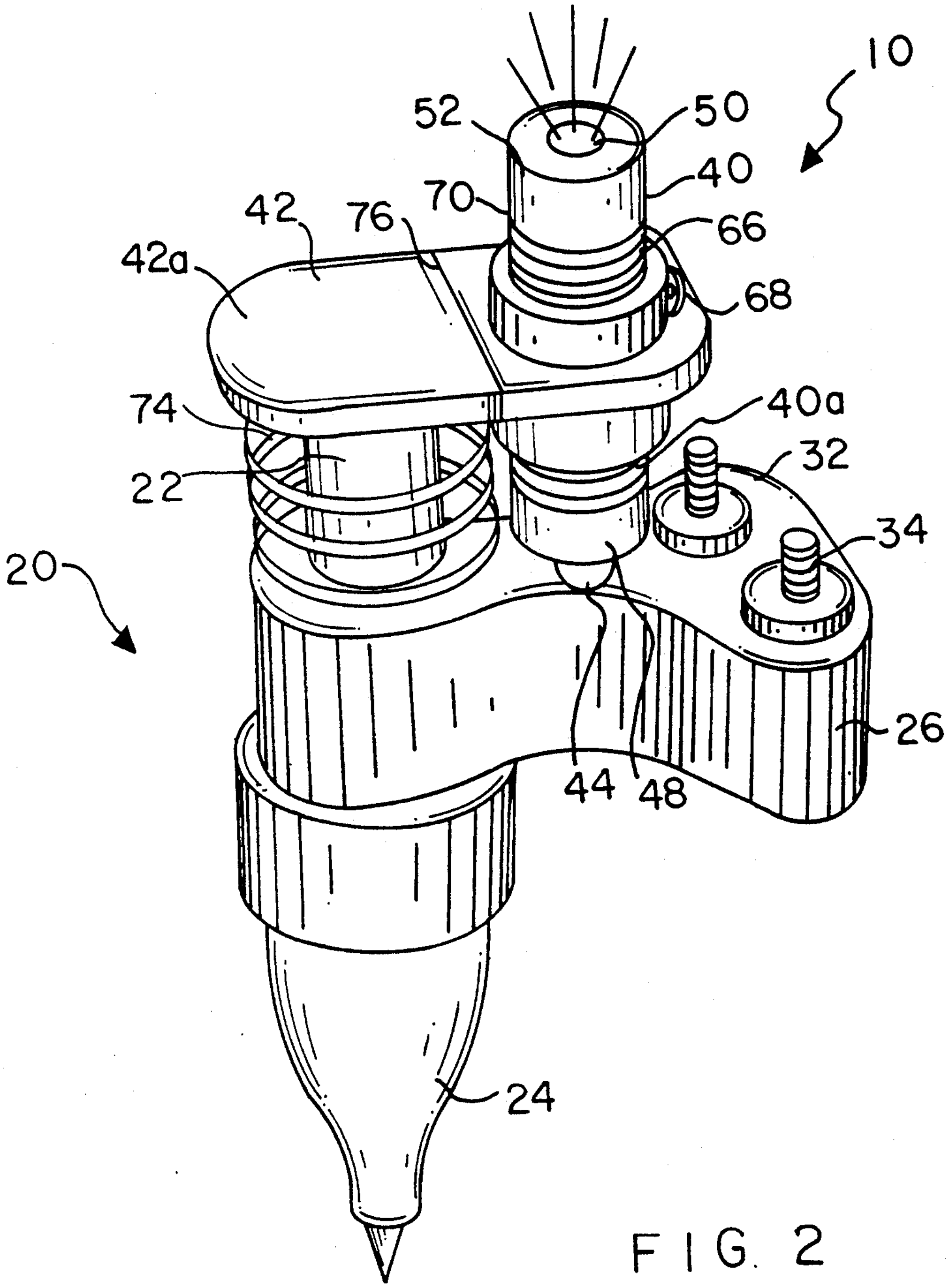
FIG. 2 is a perspective view of the inventive tuning tool properly positioned on an injector for tuning.

Referring to FIGS. 1 and 2, a tuning tool 10 is disclosed for tuning a diesel engine fuel injector 20 having a spring-biased follower 22 and a tubular body 24. Body 24 includes a radially protruding flange 26 on which a fuel inlet port 32 and a fuel outlet port 34 are mounted.

Inventive tuning tool 10 includes a hollow, cylindrical housing 40 having a perpendicularly protruding arm member 42 for placing against the top of follower 22. A plunger member 44 protrudes through one end 48 of housing 40, biased with a coil spring 46 attached to a housing support member, for bearing against injector flange 26. A light source 50 is mounted in the other end 52 of housing 40, and is activated by electricity from an electric power source 54 delivered through a circuit 56 inside housing 40. Circuit 56 includes a first conductor member 62 structurally connected to housing 40 and a second conductor member 64 attached to plunger member 44. Circuit 56 is completed when housing 40 is moved relative to plunger member 44 to a specific, pre-calibrated position, bringing conductor members 62 and 64 into contact with each other. Light source 50 is activated as a result, and signals proper tuning.

Figure 3:
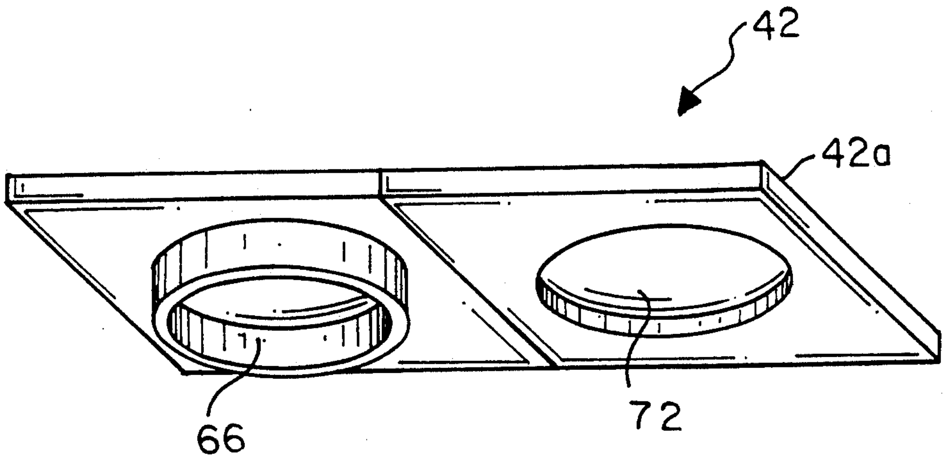
FIG. 3 is a close-up view of the arm member having the preferred hinge and follower recess features.

Arm member 42 is preferably a plate having a flanged bore 66 through which the cylindrical portion of housing 40 fits, and a set screw 68 for removably securing arm member 42 in place on housing 40. See FIG. 3. Calibration markings 70 are preferably provided along the exterior surface of housing 40 for positioning member 42 for specific injector adjustment measurements. Housing 40 may have external threads **40*a* and flanged bore 66 have internal threads to permit fine arm member 42 adjustments. Arm member 42 also preferably has a circular recess 72 for receiving a magnet 42*b* to hold tool 10 to the top 74 of a follower 22. Magnet 42*b* helps prevent tool 10 from sliding off follower 22 during injector 20 adjustment. Arm member 42 is preferably also hinged along a line 76 adjacent to housing 40 so that the remote end 42*a* of member 42 can pivot against housing 40 when tool 10** is not in use.

Figure 4:
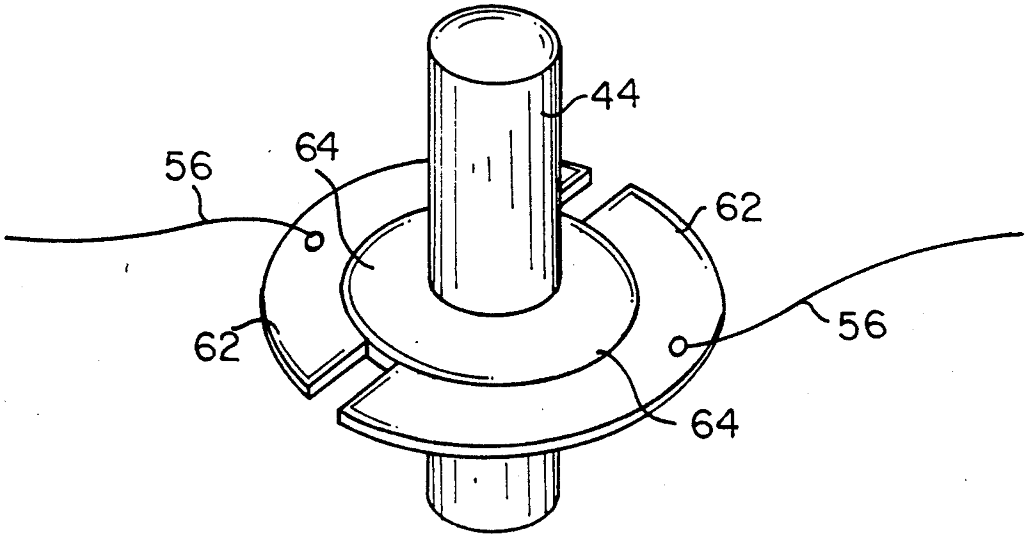
FIG. 4 is a perspective view of the conductor members which form a switch in the circuit at the plunger member.

Light source 50 is preferably a light emitting diode (LED), but may also be a light bulb, and fits into a socket 80 within housing 40, having terminals 82 and 84. Circuit 56 connects to terminal 84 and extends toward end 48 of housing 40 and connects to first conductor member 62. See FIG. 1. First conductor member 62 is preferably a metal washer having a diametric split 86 supported by housing lip member 88. Circuit 56 connects to both half portions of first conductor member 62 so that split 86 opens circuit 56. Second conductor member 64 is preferably a solid metal washer mounted parallel to first conductor member 62. See FIG. 4. Second conductor member 64 preferably slides through the central port 92 in first conductor member 62, thereby making simultaneous contact with both halves of first conductor member 62. In this way, second conductor member 64 completes circuit 56 when positioned within first conductor member 62, and breaks circuit 56 when it moves out of first conductor member 62. Circuit 56 continues from first conductor member 62 to connect to terminal 82 of socket 80.

It is to be understood that tool 10 may be adapted for use on non-diesel engines, and used for other measuring purposes as well.

Method

In practicing the invention, the following method may be used. To operate tool 10, the position of arm member 42 is adjusted by moving arm member 42 to a location marked by a marking 70 and tightening set screw 68. Plunger member 44 is placed against injector flange 26 and housing 40 is moved longitudinally against the biasing of plunger coil spring 46 until housing arm member 42 makes contact with the top 74 of follower 22. Light source 50 is activated only when the follower 22 elevation relative to injector body 24 reaches the adjustment specified for the particular engine. Follower 22 can be adjusted while tool 10 is positioned against it so that adjustment can stop as soon as light source 50 is illuminated.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A tool for tuning an engine having a fuel injector unit comprising a follower and a body having a flange portion protruding outward from said body, comprising:

a support structure having a follower contact surface,
a plunger member slidably connected to said support structure, for bearing against said flange portion,
a light source connected to a power source,
a circuit for delivering electric current from said power source to said light source,
switch means which closes said circuit when said plunger member is moved to a predetermined position, and opens said circuit when said plunger member moves out of said predetermined position.

2. A tool as in claim 1, wherein said support structure comprises a tubular housing having two ends and which receives said plunger member in one said end.

3. A tool as in claim 1, additionally comprising:

spring means for biasing said plunger member in an extended position relative to said support structure.

4. A tool as in claim 1, wherein said light source is a light emitting diode.

5. A tool as in claim 1, wherein said light source is a light bulb.

6. A tool as in claim 1, wherein said switch means comprises:

an outer washer member structurally connected to said support structure and split into at least two portions, said circuit being connected to both portions of said outer washer member such that said split opens said circuit, an inner washer member structurally connected to said plunger member, such that said outer washer member can move with said support structure relative to said inner washer member and said plunger member so that said outer washer member fits around said inner washer member and makes simultaneous contact with said portions of said outer washer member, thereby closing said circuit.

7. A tool as in claim 1, wherein said follower contact surface comprises an outward projecting arm member.

8. A tool as in claim 7, wherein said arm member comprises:

a plate having a recess for receiving the top of said follower.

9. A tool as in claim 7, wherein said arm member comprises:

a hingedly connected portion which can be pivoted against said support structure for compact storage.

10. A method for tuning a fuel injector having a follower and a body portion and a flange protruding from said body portion, using a tool comprising a support structure having a follower contact surface, a plunger member slidably connected to said support structure, for bearing against said flange portion, a light source connected to a power source, a circuit for delivering electric current from said power source to said light source, switch means which closes said circuit when said plunger member is moved to a predetermined position, and opens said circuit when said plunger member moves out of said predetermined position, comprising the steps of:

placing said plunger member against said flange, positioning said follower contact surface over said follower, moving said support structure toward said flange until said follower contact surface touches said follower, observing whether said light source becomes activated.

* * * * *